United States Patent
Daboul et al.

(10) Patent No.: US 12,018,658 B2
(45) Date of Patent: Jun. 25, 2024

(54) METHOD FOR EFFICIENTLY COOLING A WIND POWER INSTALLATION

(71) Applicant: Wobben Properties GmbH, Aurich (DE)

(72) Inventors: Hussam Daboul, Südbrookmerland (DE); Mats Volles, Karlsruhe (DE); Andreas von Albedyll, Bremen (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/980,989

(22) Filed: Nov. 4, 2022

(65) Prior Publication Data
US 2023/0132516 A1    May 4, 2023

(30) Foreign Application Priority Data
Nov. 4, 2021   (EP) ..................................... 21206380

(51) Int. Cl.
*F03D 80/60*    (2016.01)
*F03D 9/25*    (2016.01)

(52) U.S. Cl.
CPC ............. *F03D 80/60* (2016.05); *F03D 9/255* (2017.02); *F05B 2260/20* (2013.01)

(58) Field of Classification Search
CPC ....................................................... F03D 80/60
See application file for complete search history.

(56) References Cited

U.S. PATENT DOCUMENTS

| | | | |
|---|---|---|---|
| 10,151,301 B2 * | 12/2018 | Caponetti | ............... F03D 7/042 |
| 2015/0001847 A1 | 1/2015 | Oba et al. | |
| 2020/0011303 A1 * | 1/2020 | Airoldi | ................... F03D 80/80 |
| 2021/0190035 A1 | 6/2021 | Daboul et al. | |

FOREIGN PATENT DOCUMENTS

| | | | | |
|---|---|---|---|---|
| EP | 2821642 A1 | | 1/2015 | |
| EP | 3562002 A1 | * | 10/2019 | ............. F03D 80/60 |

* cited by examiner

*Primary Examiner* — Brian O Peters
(74) *Attorney, Agent, or Firm* — Seed IP Law Group LLP

(57) ABSTRACT

Method for operating a wind power installation which has a rotor and feeds an output power from wind, the latter having a wind speed, into an electric supply grid, and controls cooling of a component of the wind power installation, wherein an operational evaluation is carried out, in which an operating state or an operating state variation is evaluated, and the cooling is controlled as a function of a component temperature and additionally as a function of the operational evaluation.

13 Claims, 3 Drawing Sheets

METHOD FOR EFFICIENTLY COOLING A WIND POWER INSTALLATION

BACKGROUND

Technical Field

The present invention relates to a method for operating a wind power installation, and relates to a corresponding wind power installation.

Description of the Related Art

Wind power installations generate an output from wind and feed the output into an electric supply grid. For increasing the efficiency of the generator used for this purpose, cooling can be provided. The cooling in this instance achieves that the generator does not become excessively hot and as a result does not depart, or excessively depart, from an optimum operating point. However, the cooling can also prevent a generator from overheating and being damaged as a result. These explanations, as well as explanations hereunder, may also apply to other components such as converters or inverters on the generator and/or in the grid, respectively.

Active cooling systems, which per se however require an output and as a result may again somewhat compromise the achieved increase in efficiency, are particularly efficient.

Therefore, it can be provided that such active cooling is not permanently actuated. Instead, it can be provided that a temperature is monitored and a threshold value is established for such a temperature, in particular a generator temperature, from which threshold value cooling takes place, thus from which such cooling is actuated.

However, even in the case of such temperature-dependent cooling, the latter has a certain inherent requirement in terms of output and, as a result, can again compromise the efficiency and also reduce a maximum output that can be delivered.

BRIEF SUMMARY

At least one embodiment is directed techniques in which negative influences of the cooling on the generation or delivery of output are reduced. At least to be proposed is an alternative solution to solutions known to date.

Proposed is a method related to the operation of a wind power installation which has a rotor. Said wind power installation generates an output power from wind, the latter having a wind speed, and feeds this output power into an electric supply grid. Moreover, the wind power installation controls cooling of a component of the wind power installation. To this extent, this cooling may also be referred to as active cooling. The controlling of the cooling can in particular comprise controlling and thus operating at least one pump for pumping coolant, and moreover or alternatively comprise the controlling and thus operating of at least one blower, or a blower unit, respectively. Such a blower unit can generate and move directly an air flow provided for cooling, and/or force air for cooling through a heat exchanger. In particular when such a heat exchanger is being used, it is considered that the controlling of the cooling comprises the controlling of at least one pump and moreover the controlling of at least one blower unit. To this end, the pump can pump coolant for cooling through the component, and the coolant can be cooled again in a heat exchanger. At least one blower unit can be provided for improving the cooling of the coolant in the heat exchanger. A blower unit can synonymously also be referred to simply as a blower, fan, fan unit or ventilator. It is furthermore proposed that an operational evaluation is carried out, in which an operating state or an operating state variation is evaluated. Various examples of an operational evaluation are explained hereunder. A simple example can lie in that it is evaluated as an operational evaluation whether the wind power installation feeds a nominal output power.

It is furthermore proposed that the cooling is controlled as a function of a component temperature and in addition as a function of the operational evaluation. The controlling of the cooling is thus carried out at least as a function of two criteria.

It is proposed in particular that it depends on the component temperature and additionally on the operational evaluation whether the cooling is controlled in the first place, or whether said cooling remains inactive or passive, respectively. However, the cooling as a function of the component temperature and additionally of the operational evaluation can also be controlled at a different intensity. In this instance, the controlling of a rotating speed of a pump and/or of a rotating speed of a blower unit is considered in particular.

In any case, it is the fundamental concept that the component temperature is a good criterion for controlling the cooling as a function thereof, but that an improvement in the efficiency of the wind power installation can be achieved by taking into account at least one further criterion. If the wind power installation operates at a nominal output, for example, thus feeding a nominal output, the cooling, which may synonymously also be referred to as a cooling system, can also operate at low component temperatures. In this way, the efficiency is increased in this full-load operation, thus when the installation produces a nominal output, but also in the partial-load operation when the wind is weak, thus when the wind speed drops, in particular drops below a nominal wind speed. The reason therefore lies in that the component temperature is then lower than if the cooling had not operated in the previous case, thus still in the full-load range. However, when the wind power installation does produce a nominal output, the output is sufficient for operating the cooling system so that it is proposed that the cooling system is operated even at low temperatures in this instance, so as to achieve the optimum efficiency as a result.

The cooling is in particular provided for cooling the generator of the wind power installation, and in this instance a generator temperature is used in particular as the component temperature. However, other components are also considered, such as a converter on the generator, said converter thus actuating the generator. Cooling on a converter in the grid is likewise considered, said converter thus feeding an electric output into the electric supply grid or generating a corresponding current for this purpose, respectively, so as to mention only two further important examples.

According to one aspect, it is thus proposed that as cooling of a component of the wind power installation, cooling of a generator of the wind power installation and/or cooling of an inverter of the wind power installation are/is provided and controlled. The inverter can be an infeed unit for feeding an electric output into the electric supply grid, or be part of an infeed unit. The inverter can also be a converter on the generator, for actuating the generator, or part thereof. The converter on the generator can also be configured as a rectifier, or be referred to as a rectifier, respectively. The inverter can also form or comprise the converter on the generator and the infeed unit conjointly. All these components, specifically the converter on the generator, the infeed unit and/or the rectifier, can be combined under the term "inverter" or "inverter unit." In this way, a generator temperature or an inverter temperature, respectively, is used as the component temperature. The inverter temperature is thus representative of a temperature of the infeed unit or of the converter on the generator. In this way, the generator temperature is used for cooling the generator, and the inverter temperature is used for cooling the inverter unit.

The component temperature, and in this way also the generator temperature or the inverter temperature, can also be detected and/or taken into account indirectly in that the temperature of a cooling medium is detected or taken into account, said cooling medium cooling the respective component.

It has been recognized here that an efficiency in terms of the generation of the electric output from wind depends in particular on the generator and/or the inverter unit, and the feeding of this electric output into the electric supply grid depends on the efficiency of the generator and/or of the inverter unit. Therefore, it is expedient for an efficient cooling system to be used in particular for these components, or for the efficiency of a present cooling system to be improved, respectively.

According to one aspect, it is proposed that as an operational evaluation, at least one of the following evaluations is carried out. If a plurality of the evaluations are carried out, said plurality of elevations can conjointly form the operational evaluation. To this extent, an operational evaluation is also a consideration of a plurality of characteristics or aspects of the operation of the wind power installation.

As an evaluation, it is proposed to check whether the wind power installation feeds a nominal output. This point has already been mentioned as an example above. It is provided in particular here that the cooling, or the cooling system, respectively, operates with a full output independently of the component temperature. Cooling is thus also proposed at a low component temperature. The cooling here is nevertheless controlled as a function of the component temperature because the latter is detected irrespectively, and it is also proposed in particular that the method continuously detects the component temperature and controls the cooling as a function thereof. In response to the question pertaining to whether, or how, the cooling is controlled, the component temperature and the operational evaluation are thus queried. Said component temperature and said operational evaluation form the input variables for the decision as to whether and optionally how the cooling is controlled. This does not preclude that already one criterion can lead to the cooling being controlled.

It has in any case been recognized that when the installation generates a nominal output, there is sufficient available output, and it is therefore proposed that the cooling is controlled in any case so as to increase the efficiency of the respective component, thus in particular of the generator and/or of the inverter unit, as a result.

According to one evaluation, it is checked whether the wind power installation operates in a reduced-output operation. In this case, the installation, independently of the wind, thus of the wind speed, must produce only a maximum predefined output, thus not exceed the latter. The wind power installation thus does not generate a nominal output but is restricted to a lower value. Such a parameter can be provided, for example, so that noise or other critical features does/do not exceed a corresponding limit value. It is also provided for such a case that the cooling system rotates at the full output, thus cooling pumps and/or blowers are actuated at full output.

It has been recognized in particular here that in this reduced operation more output is present and can be generated than is permitted to be fed. This output, or part thereof, respectively, can be used for controlling the cooling. In this instance, the wind power installation, in particular the generator and/or the inverter unit, operates at a better operating point. Such a better operating point may also include that less wear and tear arises, and/or there is a lower risk, during the operation of the wind power installation.

It has also been recognized here that, as a result, the wind power installation has better start-up conditions, thus has lower temperatures, this also leading to a higher efficiency when a normal operation with an optimum exploitation of output is possible again. It has also been recognized here that a temperature variation occurs relatively slowly, and the cooling in the reduced-output mode even after the end of the latter can thus still be effective in the subsequent non-reduced operation.

As a further potential evaluation it is checked whether the wind power installation operates in an inertia operation in which, for increasing the infed output, an electric output from kinetic energy of the rotor is fed in addition to the electric output currently generated from wind.

Such an inertia operation can also be referred to synonymously as an operation with a momentary output increase, in particular as an operation with a momentary output increase by way of an output from kinetic energy. The particular key issue in such an inertia operation lies in providing a momentary reserve to the electric supply grid. The infed output here can be briefly increased, in particular in a range of less than 5 seconds, in particular less than 1 second, by at least 5%, in particular by at least 10%, specifically by way of an output which is able, at that moment, to be generated from wind and to be fed.

It has been recognized in particular here that such an inertia operation lasts only for a short period of time, in particular for less than 1 minute, in particular less than 30 seconds. As much additional output as possible, and thus as much additional energy as possible, is to be fed into the electric supply grid during this time. This additional output is not generated from wind, but extracted from the kinetic energy of the rotor, so that a high efficiency is not important in this context. It has been recognized that it is instead far more important that the output which otherwise would be required for cooling is also conjointly fed into the electric supply grid. It has also been recognized that the temperature cannot sharply increase anyway during this short time in which such an inertia operation is carried out. It is in particular the thermal inertia of the generator that prevents any significant temperature increase of the generator during the mentioned short time of less than 1 minute, in particular of less than 30 seconds. It can likewise apply to other components of a wind power installation that have to be cooled that the component temperature does not very rapidly increase.

It has likewise been recognized that such inertia operations are comparatively rare, so that no significant deterioration of the service life of the wind power installation is to be expected as a result of the cooling being dispensed with either.

As a result of the output, or energy, respectively, required for cooling in this instance being able to be fed more into the electric supply grid, said output can be correspondingly obtained to a lesser extent from the kinetic energy of the rotor, this in turn resulting in a somewhat lower deceleration of the rotor. It can in turn be achieved in this way that the risk of the wind power installation being unintentionally stopped, thus stalled, is reduced.

According to one evaluation it can be checked whether and/or to what extent a variation, in particular a reduction, of the infed output is predicted. It has been recognized in particular here that in the event of a reduction of the infed output, lower temperatures are also to be anticipated and cooling is no longer required at the latest at that stage, and the output for cooling is better used for being fed into the electric supply grid. It has been particularly recognized to this end that switching off the cooling, or reducing the cooling, is already expedient in the case of a predicted output decrease, because it can be identified already then that said cooling is not required and the output can be fed in better, as long as the wind power installation has not yet reached a nominal output.

Conversely, however, the prediction of an output increase can also lead to the control of the cooling being switched on or not being switched off.

In the context of this evaluation but also the other evaluations, it is however to be taken into account that the component temperature is additionally taken into account. Also in a concept in which the operational evaluation can lead to the cooling being reduced or switched off, a very high component temperature can however lead to the cooling being switched on or continued, if damage is prevented or avoided as a result.

It can be checked as an evaluation whether and to what extent a variation of weather conditions is predicted.

This is also based on the concept that an intelligent or predictive cooling system control is possible. To this end, a weather model or grid model can supply a specific prognosis, the latter forming the basis for such an intelligent or predictive cooling system control. Moreover or additionally, machine learning or else artificial intelligence is also considered for supplying such prognoses. For example, this can also lead to a prediction that the wind speed will drop, for example to below 6 m/s in the next 12 hours, which can lead to the cooling system being able to be switched off and to more energy thus being able to be fed into the electric supply grid.

The prediction of weather conditions and/or variations of weather conditions can however also include the prediction of an external temperature and in particular the variation of an external temperature. For example, if it is identified that the external temperature will sharply drop, this can already be a reason for switching off or reducing the cooling system prior thereto, thus for terminating or reducing the controlling of the cooling.

As an evaluation, it can also be checked whether a reduction of the wind speed is predicted, in particular a reduction to a value below a nominal wind speed. If it is predicted that the wind speed will drop below a nominal wind speed, an early end of a full-load operation and thus a drop in the output below the nominal output can also be concluded therefrom. As long as the wind power installation still operates in the full-load operation and there is sufficient output available, a cooling control can be provided and be expedient in order to achieve, for the anticipated operation at a lower output, thus in the partial-load operation, a high efficiency by a low temperature as the start-up condition in this partial-load operation. However, the cooling can be terminated or reduced immediately at the moment at which the output drops thereafter, so as to better infeed the output being freed up as a result.

It can be achieved in particular as a result of such a prediction that the cooling is controlled, the cooling system is thus switched on, when there is sufficient output available, but the high efficiency as a result of the low temperature is utilized when the cooling is no longer active. In this instance, the high efficiency can thus be utilized, and the output required for cooling can nonetheless be conjointly fed, because the cooling is no longer active at this moment.

As an evaluation it can also be checked whether an output consumption of the cooling exceeds an output increase of the component, in particular of the generator and/or of the inverter unit, caused by an efficiency increase achieved by the cooling. It is thus proposed here that the potential output consumption of the cooling is compared with the output increase as a result of an efficiency increase. If the cooling consumes more output than could be additionally generated as a result of the increase of the efficiency, the cooling, thus the controlling of the cooling, or of the cooling system, respectively, can be dispensed with.

Here too, additional considerations of one or a plurality of the other evaluations can be included and combined. In particular when the difference between the output consumption of the cooling and the achievable output increase is minor, it can be checked which situation is predicted for the near future. It can be decided as a function thereof whether or not the actuation of the cooling is expedient for this near future.

In this context, all evaluations can be combined, thus be considered in combination. In particular, two evaluations or even more evaluations are conjointly evaluated.

As an evaluation it can also be checked what correlation there is between an output consumption of the cooling and an output increase of the component, in particular of the generator and/or of the inverter unit, caused by an efficiency increase achieved by the cooling.

Here too, a comparison is made using the correlation between the output consumption of the cooling and the output increase as a result of the efficiency increase. It is in particular proposed here that a general correlation is established, in particular a ratio between the output consumption of the cooling and the achievable output increase. If this ratio is less than 1, in order to stay with this example, the controlling of the cooling is fundamentally expedient, while being less expedient otherwise. Here too, however, additional considerations can be relevant, additional evaluations being taken into account in particular. The component temperature is of course taken into account here too. If said component temperature is particularly high, the decision to control the cooling can nevertheless be taken in order for the wind power installation to be protected and/or for an excessive reduction in the service life to be avoided.

According to one aspect, it is proposed that for controlling the cooling, at least one blower and/or one pump of a cooling system of the wind power installation are/is controlled, and the cooling is controlled in particular such that the blower and/or the pump of the cooling system are/is operated in a nominal operation, in a reduced operation, or not operated at all. The controlling of the cooling is thus implemented by way of the blower or the pump, as has already been described above. In particular, the states can be changed according to the criteria mentioned, so that the blower and/or the pump operate/operates in the nominal operation or are/is not operated at all. The best possible cooling is achieved in the nominal operation, and when the cooling is not operated at all, said cooling also does not require any output, the latter thus being available for infeeding. Nevertheless, it has been recognized that even minor cooling can be expedient in some cases, without however applying the full output, thus the nominal output, of the cooling system.

A reduced operation can be provided in particular when the reduced output required therefor is less than an output increase as a result of the improved operating point.

According to one aspect it is proposed that the cooling is controlled such that said cooling is not operated when the component temperature is below a first limit temperature. If the component, in particular the generator and/or the inverter unit, is very cold in the first place, there is no need for the cooling to be controlled either.

It is furthermore proposed that the cooling is controlled as a function of the operational evaluation, in particular as a function thereof in a nominal operation, in a reduced operation, or not operated at all, when the component temperature is between the first limit temperature and a second limit temperature which is higher than the first limit temperature. In this case, thus when the temperature is between these two limit values, the operational evaluation is decisive. It has been recognized that the component temperature in this instance is neither so low that any cooling would be unnecessary, nor that the component temperature is so high that cooling should be carried out in any case in order for the installation to be protected.

Moreover or alternatively, it is proposed that the cooling is operated at the maximum output when the component temperature is above the second limit temperature. It has thus been recognized here that cooling at such high temperatures has to take place in any case in order to avoid damage to the wind power installation or at least the reduction in the service life of the wind power installation.

According to one aspect it is proposed that the cooling is controlled such that said cooling is operated in a nominal operation when the wind power installation feeds the nominal output, when the wind power installation operates in a reduced-output operation, when a reduction in the wind speed is predicted, in particular when a reduction to a value below a nominal wind speed is predicted, and/or when a reduction in the infed output is predicted. These criteria are derived in particular from the operational evaluation explained above. Aspects of the strategy have also already been explained at that point.

It has been recognized in any case that there is sufficient output for cooling when a nominal output is fed, and it is therefore expedient to achieve a high efficiency by cooling. In a reduced-output operation, there is anyway excess output for operating the cooling, so that this is proposed. If a reduction in the wind speed is anticipated, a good operating point is prepared as a result of the prior cooling. The same applies to an anticipated reduction in the infed output.

The cooling is preferably controlled such that said cooling does not take place or takes place at a reduced output when, in terms of a nominal operation of the cooling, an output consumption of the cooling exceeds an output increase of the component caused by an efficiency increase achieved by such cooling. If the cooling thus consumes more output than is gained by an efficiency increase, said cooling is switched off or at least reduced. This can in each case also be a result of the operational evaluation.

Moreover or alternatively, it is proposed that the cooling is controlled such that operating does not take place when said wind power installation operates in an inertia operation in which, for increasing the infed output, the electric output from kinetic energy of the rotor is fed in addition to the electric output currently generated from wind. For this inertia operation it has been recognized in particular that said inertia operation is short and cooling is dispensable for this short moment, and the output that is freed up as a result should better be used for infeeding, so as to support the electric supply grid as a result.

According to one aspect it is proposed that the operational evaluation is carried out as a function of a location of the wind power installation. It is proposed in particular that the operational evaluation is carried out as a function of at least one location parameter that characterizes the location of the wind power installation. It is provided in particular that the operational evaluation is carried out as a function of an altitude of the location and/or as a function of an average temperature of the location and/or as a function of an average wind speed of the location. Moreover or alternatively, it is provided that the at least one location parameter is determined as a function of the altitude of the location and/or of the average temperature of the location and/or of the average wind speed of the location.

It is thus proposed that the locations are distinguished according to at least one of the criteria mentioned, and that the operational evaluation is in each case adapted thereto. The average temperature and the average wind speed can in particular in each case be recorded over a long period of time, in particular over a year, for this purpose. An observation for only a particular period of time, such as a season, or only during the day or during the night, is also considered. However, when taking into consideration temperature and/or wind speed for the operational evaluation, or as a direct criterion for controlling the cooling, current measured values are used. In particular, mean values of a short period of time, such as one minute or 10 minutes, are considered here.

It has been recognized in particular here that fundamentally different behaviors and/or particularities, which can also have an effect on the cooling and the action of the latter, can be expected, depending on the location. An altitude has a particular effect on the air pressure and thus also on the air density at the location. A low density can lead to the wind power installation being operated by way of an adapted characteristic curve, and other rotating speeds can lead to other temperature profiles, particularly in the generator. The temperature development in the generator as a result of the operation can be varied, and inherent cooling caused by rotation can also be varied.

An increased or decreased average temperature at the location influences in particular the cooling requirement, the latter being correspondingly increased or decreased. Cooling is thus more likely to be provided at an increased average temperature than at a decreased average temperature. It is also considered that the first and the second limit temperature are chosen as a function of the average temperature of the location.

An average wind speed of the location has a particular effect on how the cooling is controlled as a function of an estimated variation of the wind speed. It is considered in particular that cooling is more often controlled at an increased average wind speed so as to achieve a good efficiency, because sufficient output from wind is more often available to this end.

It is considered that these criteria, thus in particular the altitude, the average temperature and the average wind speed of the location, are directly evaluated and/or incorporated in a location parameter. Each of these criteria can in particular form or vary a location parameter. For example, a location parameter which accepts values in the range from 0 to 1 can be provided for the altitude, wherein the value 1 corresponds to a normal altitude at which a normal air pressure prevails, such as at sea level. The same can be provided for the average temperature and the average wind speed, wherein a parameter which in the normal case likewise has the value 1 can be provided therein, but said value can be higher as well as lower, thus for example can fluctuate from 0.5 to 2, depending on the average temperature. The same applies to the average wind speed.

According to one aspect it is proposed that a load profile of the cooling, in particular of one of the at least one blower and/or of the at least one pump, is ascertained as a function of the control of the cooling, and moreover or alternatively that a power input of the cooling, in particular of the blower and/or of the pump, is ascertained as a function of the control of the cooling and optionally as a function of the load profile ascertained.

Such a load profile indicates in particular how much output is required for a cooling activity, specifically for controlling in particular the blower and/or the pump. As a result, the cooling output, the latter thus indicating how much heat can be dissipated from the respective component, can be assigned a rated input, the latter thus indicating how much electric output the cooling requires in each case for this purpose. Depending thereon, it can be judged and decided in a situation-specific manner whether or not the cooling is actuated or whether said cooling is actuated in a reduced manner. Such a load profile can be used in particular for ascertaining and applying, thus evaluating, the operational evaluations. As a result, a correlation between the cooling result and the output required for this purpose can also be established in particular, and in this way a correlation between the achievable efficiency increase and the output to be applied for this purpose can be established. Depending thereon, it can then be judged whether the controlling of a cooling system is expedient or not in the respective situation. In a representative or simplifying manner, a rotating speed of the blower or of the pump can represent the cooling output.

If the other correlations are known, an automated implementation can also be realized by way of determining the load profile. In particular, the cooling as a function of the component temperature and as a function of the operational evaluation can be controlled automatically and thus in a correspondingly prepared feedback-control system.

Based on the load profile, or the load profiles, respectively, it is also considered, however, that decision tables are stored, which can be applied to the operational evaluations as a function of the component temperature.

According to one aspect it is proposed that an annual energy generation is ascertained as a function of an ascertained power input of the cooling, and that the controlling of the cooling is carried out such that the annual energy generation is maximized.

It has been recognized in particular here that situation-dependent controlling of the cooling is made possible by controlling the cooling as a function of the component temperature and as a function of the operational evaluation. This results in a degree of freedom of this cooling control. Depending on the application of the operational evaluation, but also depending on the choice of the first to the second limit temperature, the cooling can be controlled, thus switched on, more or less frequently. A variation of the power input of the cooling only in the case of a reduced actuation of the cooling is also considered. As a result, the power input of the cooling can be varied.

As a result of the specification of the operational evaluations and the application thereof to the control of the cooling, the power input to be anticipated for the controlling of the cooling can also be predetermined. An annual power input to be anticipated can thus be determined. The behavior mode can be varied, in particular the limit temperatures and the operational evaluation can be varied, this leading to a modified result in terms of the power input for the cooling as well as in terms of the variations of the efficiency by the cooling. As a result, such variations can vary the balance of outputs, the latter being able to be predetermined, in particular predetermined for a year.

It can thus be predetermined how variations of the evaluations and/or of the limit temperatures vary the annual energy generation; settings at which the annual energy generation is maximized can also be found in this way. A prediction which is described hereunder can be used in particular for this predetermination.

In particular, a predefinable correlation between the control of the cooling and the operational evaluation can be varied. Such a predefinable correlation can predefine, for example, which predicted wind speed variation and/or predicted output increase leads to controlling, thus starting-up, of the cooling, and which does not yet lead to the latter. Any potential reduced actuation of the cooling can also be predefined in such a correlation. This correlation can then be varied, for example in that the cooling is actuated already at a predicted minor wind speed reduction, or only at a high wind speed reduction. The operation and the power input of the control of the cooling can then be predetermined in conjunction with a weather model for the location for the entire year.

According to one aspect it is proposed that for predicting a variation, in particular a reduction in the infed output, a grid model which represents a behavior of the electric supply grid is used, and/or for predicting a variation of weather conditions, a weather model is used, and that optionally the grid model and the weather model are used conjointly for predicting a variation of the infeed.

It has been recognized in particular here that the weather, on the one hand, but also a behavior of the electric supply grid, on the other hand, can influence the infed output. A grid model here can in particular represent whether situations arise in which the infeed of effective output has to be reduced, in particular restricted. Such a reduction or restriction of the infeed of effective output can result in particular from frequency fluctuations of the electric supply grid. The frequency fluctuations in turn can result from non-compensated balances of outputs between infeeding generators and consuming consumers. All these behaviors, including also the grid topology, can be represented in such a grid model, and it can be anticipated so to speak therefrom how often an output reduction can result, thus how often such an output reduction can be enforced by rules.

The prediction of a variation of weather conditions by means of a weather model can predict in particular variations in the wind speed, or predict which wind speeds are to be anticipated overall for a year. Accordingly, information pertaining to how often a wind power installation feeds a nominal output according to expectations, how often said wind power installation operates in the partial-load operation, and how often said wind power installation changes therebetween can also be identified ahead of time and used for analysis of the annual energy production. The prediction of a variation of weather conditions while using a weather model can however also result in an acoustic weather situation as a further item of information. An acoustic weather situation can indicate how well and in what direction noise propagates. At locations where the wind power installation has to be restricted in terms of the operation thereof at an excessive acoustic level, this can play an important role in the prediction. It can be predicted to which extent an output limitation for noise protection reasons is to be expected, and based on the corresponding evaluation, thus as a function of the operational evaluation, a correspondingly assigned behavior of the control of the cooling can be derived therefrom.

It is proposed in particular that the grid model and the weather model are conjointly used. In this way, all the predictions explained above can be conjointly taken into account. However, a synergy effect is added in that the weather behavior can also influence the electric supply grid. For example, if increasing wind speeds are predicted in a large area and in a situation in which few consumers are active, this may also result in a reduction of the output to be fed as prescribed by the grid. A throttling of the wind power installation can thus be predicted. This can be predicted only by way of a combination of these two models.

Moreover proposed is a wind power installation. This wind power installation has a rotor, a generator, an infeed unit and at least one controllable cooling system for cooling a component of the wind power installation, wherein the wind power installation is prepared for feeding electric output into an electric supply grid. To this end, the wind power installation can use the infeed unit which is actuated such that the latter retrieves electric output from the generator which in the presence of wind is driven by the rotor, and feeds this electric output into the electric supply grid. To this end, the infeed unit can generate or control, respectively, directly or indirectly an electric current that is to be fed into the electric supply grid.

The generator and/or the infeed unit can in each case form in particular a component of the wind power installation, said component being in each case cooled by the at least one controllable cooling system. An inverter unit, which can form the infeed unit or part thereof, is also considered as a component to be cooled. The inverter unit, or a further inverter unit, can also be configured as a converter on the generator, for actuating the generator. The infeed unit can at the same time also be configured for actuating the generator and for feeding electric output into the electric supply grid. To this end, said infeed unit can have one or a plurality of inverter units.

Moreover, the wind power installation has an installation controller which is provided for controlling the wind power installation. Such an installation controller can also actuate the infeed unit, or control and manage the operation of the infeed unit, respectively. Likewise, the installation controller can actuate the controllable cooling system, in particular switch on or switch off the controllable cooling system and optionally carry out reduced controlling of the cooling.

The wind power installation, in particular the installation controller, is prepared for carrying out a method according to one of the aspects described above. To this end, the method can be implemented on the installation controller, in particular as a corresponding computer program. To this end, the installation controller can also have corresponding input and output interfaces by way of which said installation controller can receive in particular weather information and/or information from the electric supply grid, so as to then evaluate said information.

BRIEF DESCRIPTION OF THE SEVERAL VIEWS OF THE DRAWINGS

The invention will be explained in more detail in an exemplary manner hereunder by means of embodiments with reference to the appended figures in which.

DETAILED DESCRIPTION

Figure 1:
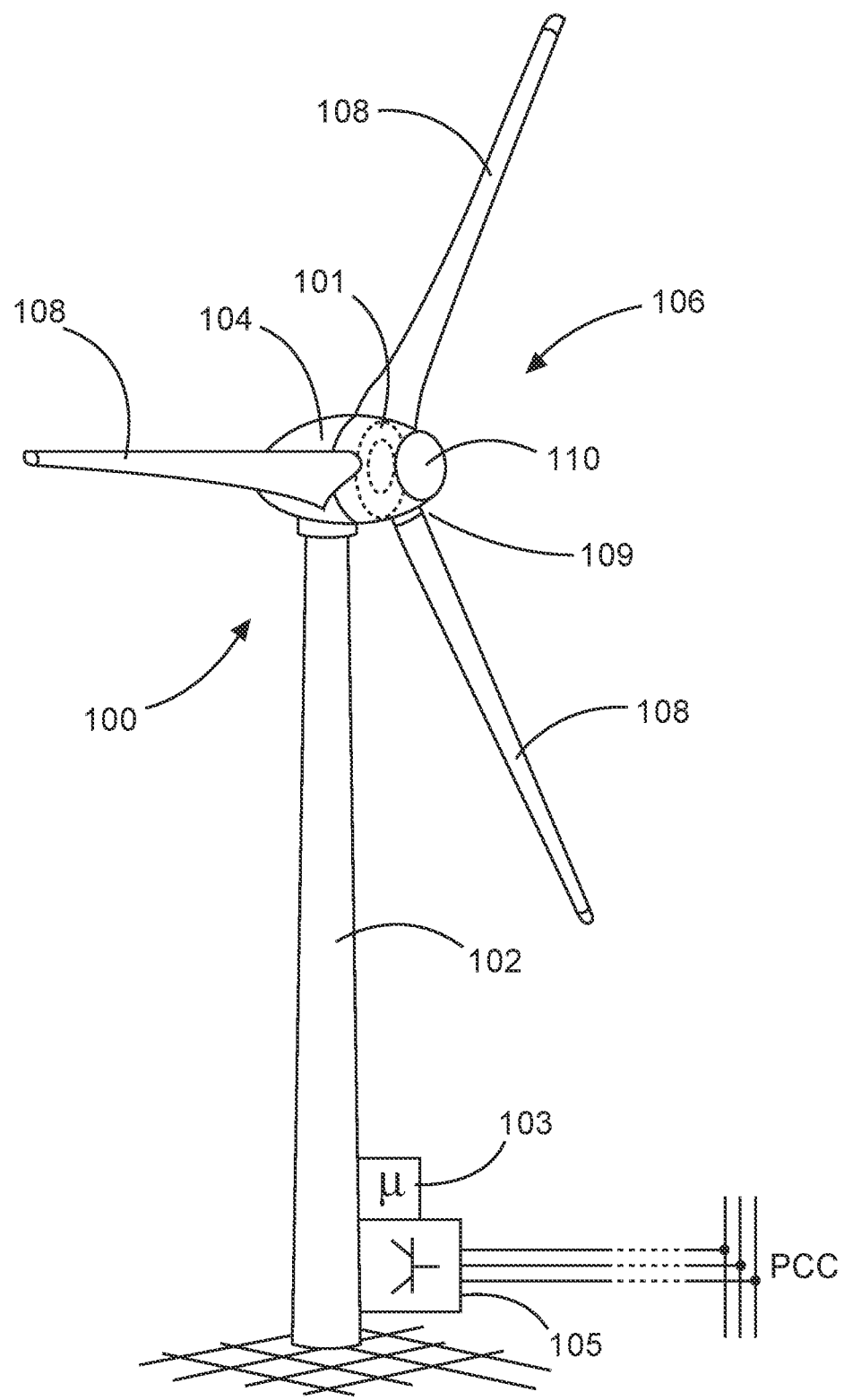
FIG. 1 shows a wind power installation in a perspective illustration.

FIG. 1 shows a schematic illustration of a wind power installation according to the invention. The wind power installation 100 has a tower 102 and a nacelle 104 on the tower 102. An aerodynamic rotor 106, having three rotor blades 108 and one spinner 110, is provided on the nacelle 104. The aerodynamic rotor 106 during the operation of the wind power installation is set in a rotating movement by the wind, and thus also rotates an electrodynamic rotor of a generator, which is coupled directly or indirectly to the aerodynamic rotor 106. The electric generator is disposed in the nacelle 104 and generates electric energy. The pitch angles of the rotor blades 108 can be varied by pitch motors at the rotor blade roots 109 of the respective rotor blades 108.

The wind power installation 100 here has an electric generator 101 which is indicated in the nacelle 104. An electric output power can be generated by means of the generator 101. An infeed unit 105, which can be configured in particular as a converter, is provided for feeding an electric output power. The infeed unit can comprise an inverter unit. Using the latter, a three-phase infeed current and/or a three-phase infeed voltage according to amplitude, frequency and phase can be generated for infeeding at a grid connection point PCC. This can take place directly or else conjointly with other wind power installations in a wind farm. An installation controller 103 is provided for controlling the wind power installation 100 and also the infeed unit 105. The installation controller 103 can also receive parameter values from outside, in particular from a central farm computer.

Figure 2:
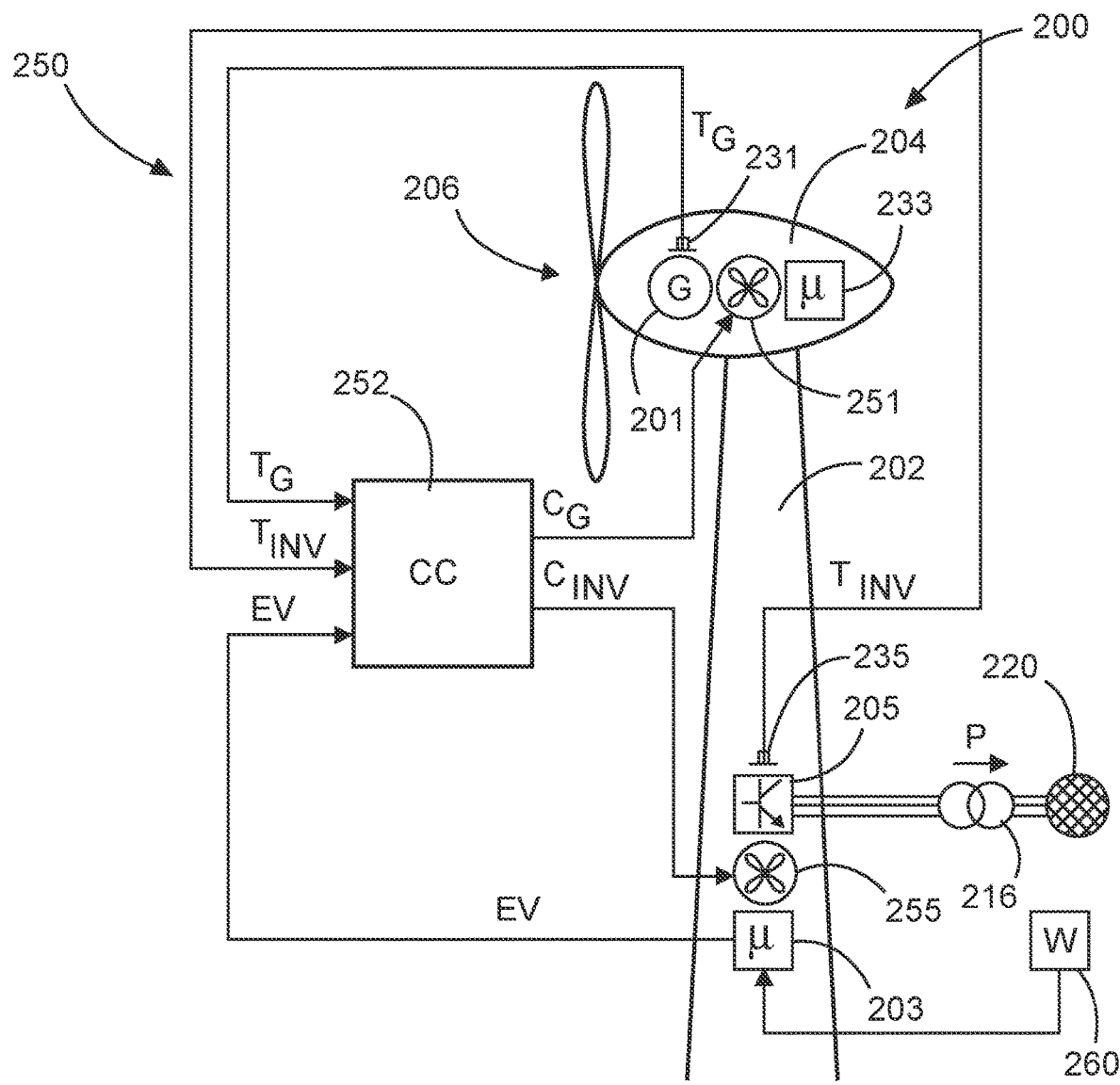
FIG. 2 shows a control structure for a cooling system in a schematic illustration.

FIG. 2 shows a control structure 250 for a cooling system in a schematic illustration. Schematically illustrated therein is a wind power installation 200 which may correspond to the wind power installation 100 of FIG. 1. This wind power installation 200 is symbolically embedded in the control structure 250. The wind power installation 200 has a tower 202 having a nacelle 204 disposed thereon, and an aerodynamic rotor 206. The aerodynamic rotor 206 drives a generator 201 which as a result generates an output power. The electric output power thus generated, minus the consumed output power, by way of an infeed unit 205 can be fed into an electric supply grid 220, usually by way of a transformer 216. An installation controller 203 for controlling the infeed unit 205 and optionally also for controlling further elements of the wind power installation can be provided.

The generator 201 and the infeed unit 205 can in particular heat up during operation. The infeed unit here can have an inverter, or an inverter unit, which heats up and is to be cooled when required. Therefore, an inverter cooling system 255 for cooling the infeed unit 205 and a generator cooling system 251 for cooling the generator 201 are provided here by way of example. A sub-controller 233 for the generator 201 and the generator cooling system 251 and potential further elements can also be provided in the nacelle 204. Any controllers can however also be bundled in the installation controller 203.

The generator 201 and the infeed unit 205, or the inverter comprised therein, respectively, thus form components to be cooled, the latter however also being potentially representative for further components to be cooled. If the generator is an externally excited synchronous generator, a chopper converter is considered as a further component to be cooled, for example. Moreover, the generator can be actuated by a converter on the generator, which may be part of the infeed unit 205 or a separate element and can also represent a component to be cooled. In principle, various actuators can also form components to be cooled when said actuators have the tendency of becoming too hot during operation.

In order for a temperature to be detected on the components to be cooled, here thus on the generator 201 and on the infeed unit 205, corresponding temperature sensors are provided, here specifically the inverter temperature sensor 235 on the infeed unit 205, and the generator temperature sensor 231 on the generator 201. Both temperatures, thus the inverter temperature $T_{INV}$ of the infeed unit, or of the inverter comprised therein, and the generator temperature $T_G$ at the generator, are thus detected and transmitted to a cooling controller 252. The cooling controller 252 as at least one input variable also receives an operational evaluation signal EV.

The cooling controller 252 for the generator cooling system 251 and the inverter cooling system 255, which can also be referred to as the cooling of the infeed unit or the infeed cooling, determines in each case a cooling control signal, specifically a generator cooling control signal $C_G$, which actuates the generator cooling system 251, and an inverter cooling control signal $CI_{NV}$, by way of which the inverter cooling system 255 is actuated.

The cooling controller 252 thus controls the cooling as a function of the respective component temperature, here thus of the generator temperature $T_G$, or the inverter temperature $T_{INV}$. Moreover, the cooling is controlled as a function of the operational evaluation.

The operational evaluation can be carried out in the installation controller 203, this being indicated by the schematic control structure 250. However, the operational evaluation can also be carried out elsewhere. The operational evaluation can take into account various input variables, this for reasons of clarity not being plotted in FIG. 2. It can be evaluated in particular whether the wind power installation feeds a nominal output power, whether the wind power installation operates in a reduced-output power operation, whether the wind power installation operates in an inertia operation, whether a variation, in particular a reduction, in the infed output power is predicted, in order to mention a few examples. The operational evaluation signal EV is then determined from the operational evaluations, and said operational evaluation signal EV can contain the respective evaluation as Yes or No in code, and optionally be transmitted as 0 or 1. However, evaluations which have a quantitative content are also considered, in particular at which magnitude predicted variations are anticipated, such as the variation of a wind speed and/or output power and/or efficiency of the respective component to be cooled. In this way, the evaluation signal EV can also contain quantitative values.

The actuation of the individual cooling systems, here thus the generator cooling system 251 and the inverter cooling system 255, in the simplest case can be a signal for switching on or switching off. However, controlling according to the magnitude is also considered in particular. To this end, blowers pertaining to the generator cooling system 251 and the inverter cooling system 255, such as are also indicated in FIG. 2, can be quantitatively actuated in particular. To this end, a rotating speed target value can in particular be provided to the respective cooling system, thus to the respective blower. However, it is also considered, for example, that a recirculation pump is actuated in the case of a liquid cooling system. Said recirculation pump can also be controlled by way of a rotating speed parameter.

If the detected temperatures, here thus the generator temperature $T_G$ and the inverter temperature $T_{INV}$, are low, and if only a simple actuation of the cooling is provided by switching on or switching off, the control signals for the components to be cooled can thus be identical. The generator control signal $C_G$ and the inverter control signal $C_{INV}$ in this instance could thus be identical and shift in relation to the same criterion and thus at the same point in time.

However, an individual actuation preferably takes place. On the one hand, dissimilar temperatures may arise, which require cooling in the case of one of the components to be cooled, whereas the other component potentially still has a comparatively low temperature. However, it is also considered that in particular in the case of controlling by means of quantitative control signals, thus in particular when controlling the rotating speed of the fans, blowers or pumps, the latter in each case fail individually. This can also be associated with an individual load profile of the respective cooling system.

The generator cooling system 251 and the inverter cooling system 255 thus preferably receive in each case different individual rotating speed values.

In order for the evaluation to be carried out, operating variables of the wind power installation can be taken into account, in particular operating variables of the generator 201 and of the infeed unit 205, or of an inverter comprised in the infeed unit 205 and/or of another inverter, respectively. In order for predicted variables or predicted situations to be taken into account, it is considered that an external signal is received, in particular a weather prediction, or at least a wind prediction. This is symbolized by the weather prediction block 260, which transmits corresponding weather predictions or at least wind predictions to the wind power installation 200. In a symbolic manner, a transmission to the installation controller 203 is illustrated for this purpose.

Figure 3:
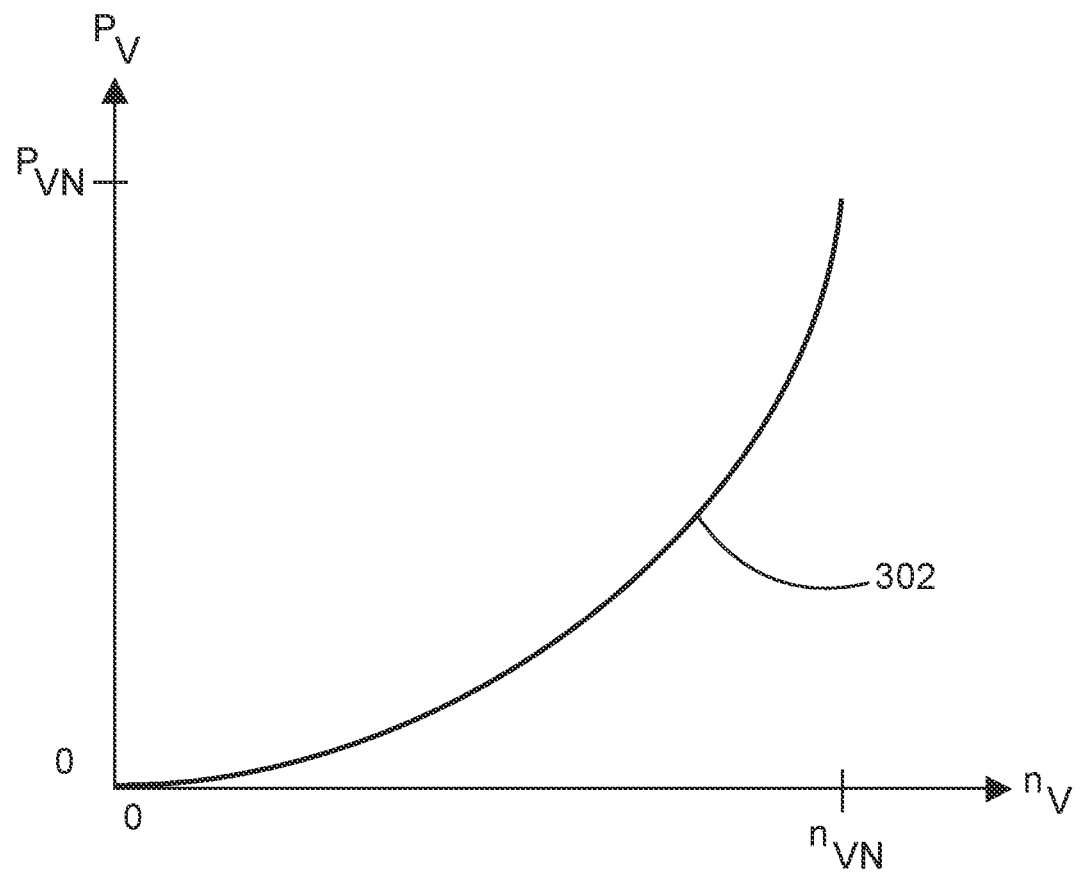
FIG. 3 schematically shows a characteristic load curve of a blower.

FIG. 3 shows in an exemplary and visualizing manner a rotating speed/output curve as a load profile of a blower, for example of the generator cooling system 251 of FIG. 2. A load profile of a pump of a liquid cooling system can also be configured in a similar manner.

The diagram on the x-coordinate thus shows the rotating speed $n_V$ of the blower, and on the y-coordinate the input $P_V$ which the blower receives in the process. The rotating speed/output characteristic curve 302 thus commences at 0 when the blower is switched off, the rotating speed and the power input likewise being 0. Said rotating speed/output characteristic curve goes up to a nominal rotating speed $n_{VN}$ of the blower, the latter ideally being reached at the nominal output $P_{VN}$ of the blower.

It can be seen that the correlation between the rotating speed of the blower and the power input is not linear. Rather, the input received increases disproportionally at higher rotating speeds. Therefore, it can be expedient to record such a load profile so as to be able to judge which rotating speed of the respective cooling system leads to which consumed output. This consumed output can then be compared with the output which is anticipated by increasing the efficiency as a result of the cooling. As long as the consumed output is lower, it can be expedient to operate the cooling at the corresponding operating point.

However, it is also considered that the pure observation of a stationary operating point is not sufficient and rather the consumed output in some cases need not be relevant, specifically when there is sufficient output, thus excess output from wind is present, and increasing the output to be delivered is achievable only later in that the previous cooling still has an after effect as a result of a correspondingly cool component.

The following has been in particular recognized:

A cooling system of a component, or of a component complex, is typically, or has to date been, primarily controlled according to the temperature of this component. In this way, overheating is to be avoided. From the point of view of maximizing the annual energy production (AEP), the controlling of the cooling system can be enhanced such that in specific cases (nominal output, reduced-output mode, inertia operation, etc.) more energy is produced than in comparison to the normal operation.

To this end, it is therefore proposed that such situations are checked. Proposed to this end is the operational evaluation.

This can serve in particular for maximizing the efficiency and thus the annual energy production (AEP) of a wind power installation.

To this end, the following is also proposed:

Developing a code, thus a computer code or a computer program, for judging/computing AEP. This also results in the advantage of a "location-specific" solution when using this idea in comparison to the normal controlling of the cooling system.

The code is developed in particular such that the same code is capable of being able to calculate the new load profiles of fans/pumps such that overloading or exceeding a service life of the components can be precluded or minimized.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
operating a wind power installation having a rotor, wherein the operating comprises:
feeding an output power from wind into an electric supply grid,
carrying out an operational evaluation in which an operating state or an operating state variation is evaluated; and
cooling a component of the wind power installation, wherein the cooling is controlled as a function of:
a component temperature, and
the operational evaluation;
wherein carrying out the operational evaluation includes one or more of:
evaluating whether the wind power installation operates in a reduced-output operation, wherein the reduced-output operation is not initiated by an observed overtemperature;
evaluating whether the wind power installation operates in an inertia operation in which, for increasing the infed output power, an electric output power from kinetic energy of the rotor is fed in addition to the electric output power currently generated from wind;
evaluating, independently of the component temperature, whether a variation of the infed output power is predicted;
evaluating whether an output consumption of the cooling exceeds an output increase of the component caused by an efficiency increase achieved by the cooling; and
evaluating a correlation between an output consumption of the cooling and the output increase of the component caused by an efficiency increase achieved by the cooling.

2. The method as claimed in claim 1, wherein the component is at least one of a generator or an inverter.

3. The method as claimed in claim 1, wherein carrying out the operational evaluation includes one or more of:
evaluating whether the wind power installation feeds a nominal output power;
evaluating whether a variation of weather conditions is predicted;
evaluating whether a reduction in wind speed is predicted; and
evaluating whether a reduction in wind speed to a value below a nominal wind speed is predicted.

4. The method as claimed in claim 1, wherein the cooling the component comprises using at least one of a blower or a pump.

5. The method as claimed in claim 1, wherein the cooling is controlled such that the cooling is stopped when the component temperature is below a first limit temperature;
wherein the cooling is controlled as a function of the operational evaluation in a nominal operation, in a reduced operation, or not operated at all when the component temperature is between the first limit temperature and a second limit temperature which is higher than the first limit temperature; and/or
wherein the cooling is controlled such that the cooling is operated at the maximum output power when the component temperature is above the second limit temperature.

6. The method as claimed in claim 1, wherein the cooling is controlled such that the cooling is operated in a nominal operation when:
the wind power installation feeds a nominal output power;
the wind power installation operates in a reduced-output operation;
a reduction in wind speed is predicted, in particular when a reduction to a value below a nominal wind speed is predicted; and/or
a reduction in the infed output power is predicted; and/or
wherein the cooling is controlled such that operating does not take place, or takes place at a reduced output power when, in terms of a nominal operation of the cooling, an output consumption of the cooling exceeds an output increase of the component caused by an efficiency increase achieved by such cooling; and/or
wherein the cooling is controlled such that operating does not take place when said wind power installation operates in an inertia operation in which, for increasing the infed output power, an electric output power from kinetic energy of the rotor is fed in addition to the electric output power currently generated from wind.

7. The method as claimed in claim 1, wherein the carrying out the operational evaluation comprises carrying the operational evaluation as a function of a location parameter of the wind power installation.

8. The method as claimed in claim 7, wherein the location parameter is one of more location parameter comprising:
   an altitude;
   an average temperature; and
   an average wind speed.

9. The method as claimed in claim 1, wherein:
   a load profile of the cooling including a blower and a pump is ascertained as a function of the control of the cooling; and/or
   a power input of the cooling including a blower and a pump is ascertained as a function of the control of the cooling.

10. The method as claimed in claim 1, comprising:
    determining an annual energy generation as a function of a power input of the cooling, and
    wherein the cooling the component takes places such that the annual energy generation is maximized.

11. The method as claimed in claim 10, wherein to maximize the annual energy generation a first limit temperature is varied, and a predefinable correlation between the cooling and the operational evaluation is varied.

12. The method as claimed in claim 1, wherein:
    for predicting a variation a grid model which represents a behavior of the electric supply grid is used; and/or
    for predicting a variation of weather conditions, a weather model is used; and/or
    the grid model and the weather model are used conjointly for predicting a variation of the infeed.

13. A wind power installation comprising:
    a rotor,
    a generator,
    an infeed unit,
    at least one cooling system configured to cool a component of the wind power installation, and
    an installation controller configured to control the at least one cooling system as a function of a component temperature and an operational evaluation, in which an operating state or an operating state variation is evaluated, wherein the operational evaluation includes one or more of:
       evaluating whether the wind power installation operates in a reduced-output operation, wherein the reduced-output operation is not initiated by an observed overtemperature;
       evaluating whether the wind power installation operates in an inertia operation in which, for increasing the infed output power, an electric output power from kinetic energy of the rotor is fed in addition to the electric output power currently generated from wind;
       evaluating, independently of the component temperature, whether a variation of the infed output power is predicted;
       evaluating whether an output consumption of the cooling exceeds an output increase of the component caused by an efficiency increase achieved by the cooling; and
       evaluating a correlation between an output consumption of the cooling and the output increase of the component caused by an efficiency increase achieved by the cooling;
    wherein the wind power installation is configured to feed electric output power into an electric supply grid.

* * * * *